(12) United States Patent
Richards et al.

(10) Patent No.: US 10,350,769 B2
(45) Date of Patent: Jul. 16, 2019

(54) FOOD PRODUCT HANDLING DEVICE, SYSTEM, AND RELATED METHODS

(71) Applicant: F.R. Drake Company, Waynesboro, VA (US)

(72) Inventors: Andre Richards, Charlottesville, VA (US); Thomas Ivy, Smithfield, VA (US); Keith W. Hopkins, Waynesboro, VA (US); George Reed, Waynesboro, VA (US)

(73) Assignee: F.R. Drake Company, Waynesboro, VA (US)

( * ) Notice: Subject to any disclaimer, the term of this patent is extended or adjusted under 35 U.S.C. 154(b) by 14 days.

(21) Appl. No.: 15/484,804

(22) Filed: Apr. 11, 2017

(65) Prior Publication Data

US 2017/0266817 A1    Sep. 21, 2017

Related U.S. Application Data

(63) Continuation-in-part of application No. 14/298,495, filed on Jun. 6, 2014, now Pat. No. 10,207,830.

(Continued)

(51) Int. Cl.
  *B25J 15/06* (2006.01)
  *B25J 11/00* (2006.01)
  (Continued)

(52) U.S. Cl.
  CPC ....... *B25J 15/0616* (2013.01); *B25J 11/0045* (2013.01); *B25J 15/0061* (2013.01); *B25J 15/0675* (2013.01); *B25J 15/0683* (2013.01); *B65B 5/08* (2013.01); *B65B 9/04* (2013.01); *B65B 19/34* (2013.01); *B65B 35/38* (2013.01); *B65G 47/918* (2013.01); *B65B 35/44* (2013.01)

(58) Field of Classification Search
  CPC ... B65J 11/0045; B65J 11/0616; B65B 35/38; B65G 47/918
  USPC ........................................................ 53/473
  See application file for complete search history.

(56) References Cited

U.S. PATENT DOCUMENTS 3,013,833 A    12/1961  Gwin et al.
3,077,993 A *  2/1963   Mulvany ................. B65B 23/08
                                                      294/184

(Continued)

FOREIGN PATENT DOCUMENTS

EP    0644120 A1    3/1995
EP    2463065 A1    6/2012
FR    2663903 A1    1/1992

*Primary Examiner* — Chelsea E Stinson
(74) *Attorney, Agent, or Firm* — Berenato & White, LLC

(57) ABSTRACT

A food product handling device includes a movable loading head having a plurality of coupling rails, a vacuum system operatively associated with the loading head, a plurality of suction devices carried by the loading head and configured to pick up and transport a food product, a plurality of mounting blocks slidably coupled to each other by the coupling rails, and an actuating device operatively associated with the mounting blocks for sliding each of the mounting blocks between a first position and a second position. Each of the suction devices is selectively coupled to the vacuum system. At least one of the suction devices coupled to each of the mounting blocks. The actuating device includes an actuating cylinder configured to displace the mounting blocks between the first position and a second position.

17 Claims, 10 Drawing Sheets

Related U.S. Application Data

(60) Provisional application No. 61/898,559, filed on Nov. 1, 2013, provisional application No. 61/832,543, filed on Jun. 7, 2013.

(51) Int. Cl.

| | | |
|---|---|---|
| *B25J 15/00* | (2006.01) | |
| *B65B 19/34* | (2006.01) | |
| *B65B 35/38* | (2006.01) | |
| *B65G 47/91* | (2006.01) | |
| *B65B 5/08* | (2006.01) | |
| *B65B 9/04* | (2006.01) | |
| *B65B 35/44* | (2006.01) | |

(56) References Cited

U.S. PATENT DOCUMENTS

| | | | |
|---|---|---|---|
| 3,920,128 A * | 11/1975 | Baker | A21B 3/18 198/468.4 |
| 3,928,942 A | 12/1975 | Paddock et al. | |
| 3,929,234 A | 12/1975 | Warren | |
| 3,934,916 A | 1/1976 | Baker | |
| 4,557,514 A | 12/1985 | Cushman et al. | |
| 4,763,941 A | 8/1988 | Sniderman | |
| 4,832,180 A * | 5/1989 | Ferrero | B65B 35/38 198/468.3 |
| 5,110,239 A * | 5/1992 | Riley | B25B 11/005 144/144.1 |
| 5,605,031 A | 2/1997 | Prakken | |
| 5,931,279 A | 8/1999 | Pedrotto et al. | |
| 5,943,842 A | 8/1999 | De Koning et al. | |
| 6,003,286 A | 12/1999 | Goodman | |
| 6,209,293 B1 | 4/2001 | Powers | |
| 6,318,777 B1 | 11/2001 | Tanaka et al. | |
| 6,352,402 B1 | 3/2002 | Hwang et al. | |
| 6,439,631 B1 | 8/2002 | Kress | |
| 7,690,706 B2 | 4/2010 | Wild et al. | |
| 8,136,802 B2 | 3/2012 | Cho | |
| 8,528,718 B2 | 9/2013 | Reed | |
| 8,534,727 B2 * | 9/2013 | Weclawski | B65G 47/918 198/468.3 |
| 2004/0094979 A1 | 5/2004 | Damhuis | |
| 2005/0028495 A1 * | 2/2005 | Blanc | B65B 5/105 53/537 |
| 2007/0044429 A1 | 3/2007 | Davi | |
| 2008/0031717 A1 * | 2/2008 | Wild | B65G 47/907 414/736 |
| 2011/0166704 A1 * | 7/2011 | Hashimoto | B25J 13/087 700/250 |

\* cited by examiner

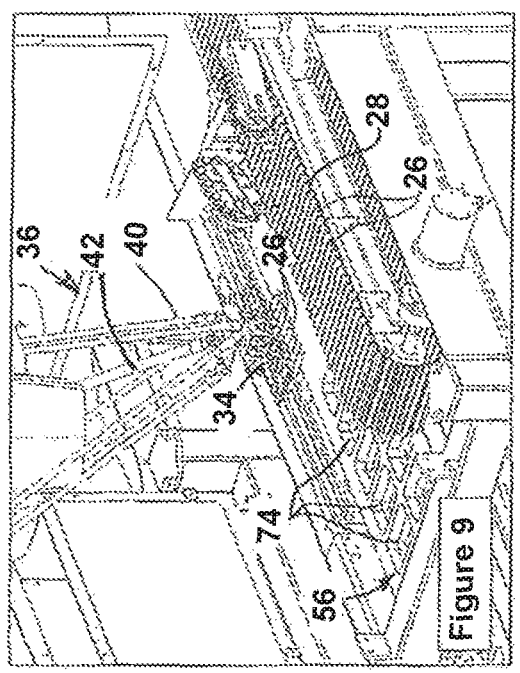
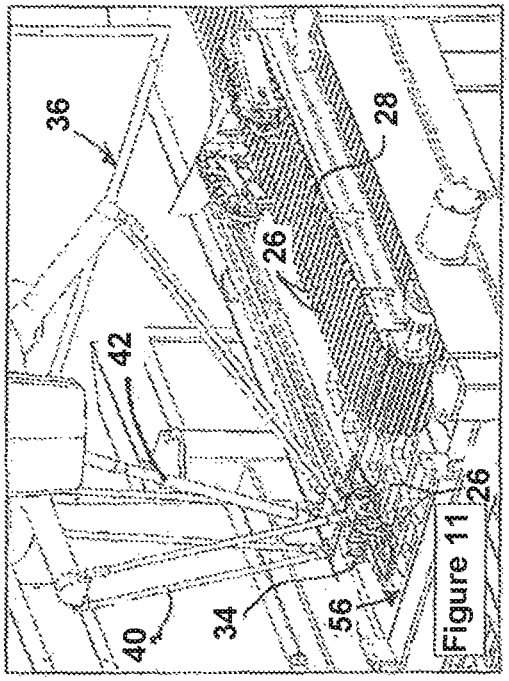
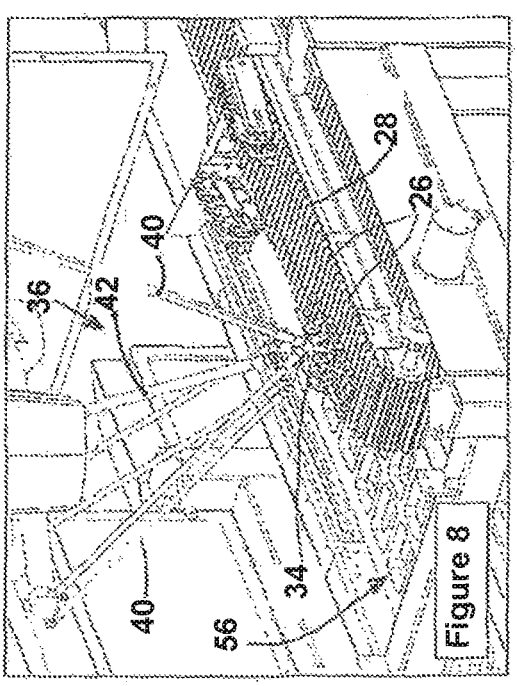
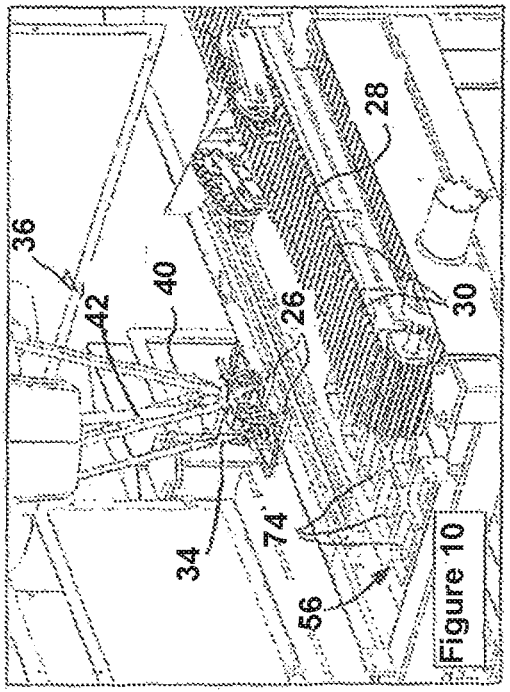

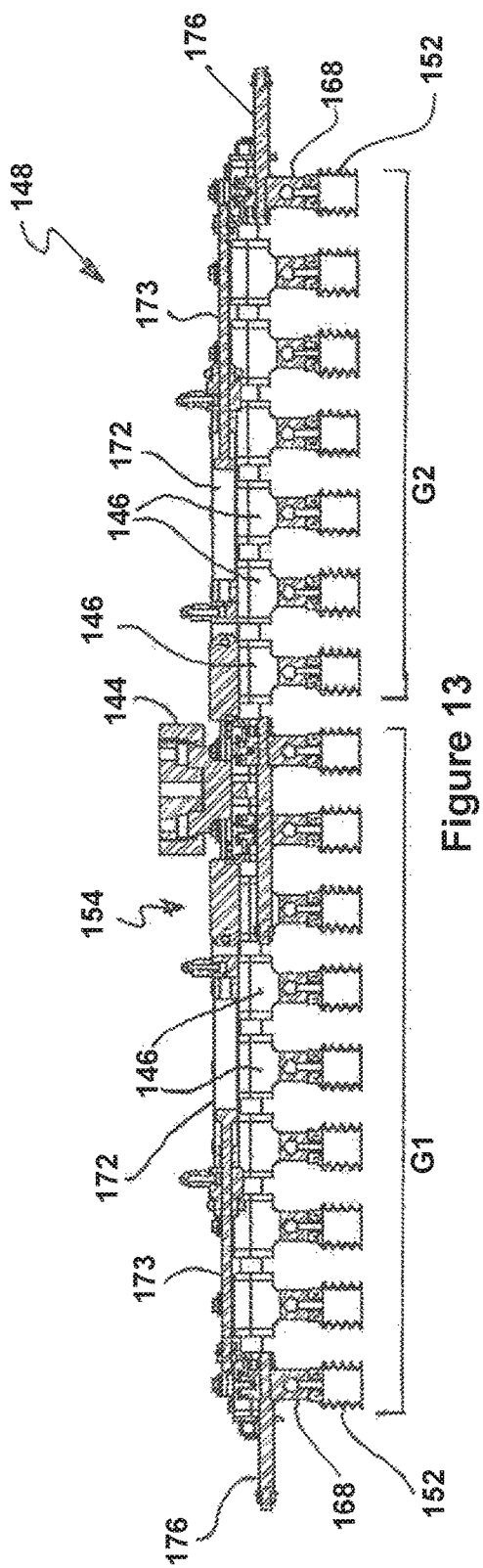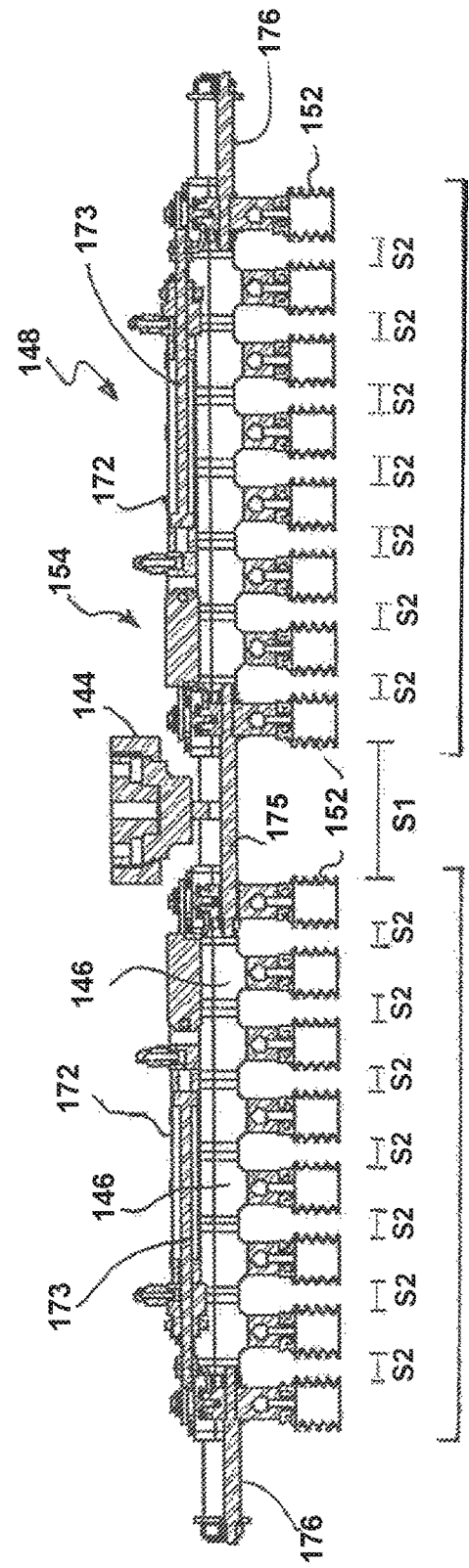

FOOD PRODUCT HANDLING DEVICE, SYSTEM, AND RELATED METHODS

The present application is a Continuation-in-Part of U.S. patent application Ser. No. 14/298,495, filed Jun. 6, 2014, which claims priority to provisional application Ser. No. 61/832,543, filed on Jun. 7, 2013, and provisional application Ser. No. 61/898,559, filed on Nov. 1, 2013, the disclosures of which are incorporated herein by reference and to which priority is claimed.

FIELD OF THE INVENTION

The present invention relates to food handling machinery, and more particularly to a robotic tool and method for sorting and organizing food products during packaging. In particular, the invention is directed to a loader head used to place tubular food products such as sausages and hot dogs, into packaging for those products.

BACKGROUND OF THE INVENTION

Food products can be packaged individually or in groups. When food products are packaged in groups each individual food product needs to be sorted, organized, and transferred prior to packaging. Conventionally, one machine is used to sort the food products, another machine is used to organize the food products, and still another machine is used to transport the sorted and organized food products to a packaging device. Alternatively, each food product can be individually transported to the packaging device until the predetermined number of food products within the group are provided to the packaging device. However, these methods undesirably increase packaging time and require numerous machines to perform the process.

Therefore, a need exists for food handling machinery and methods that improve upon prior food handling machinery and methods and solves problems inherent in known food handling machinery and methods.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

According to a first aspect of the invention, a food product handling device is provided. The food product handling device can include a movable loading head having a plurality of rails and a vacuum system operatively associated with the head. In addition, a plurality of suction devices carried by the head and configured to pick up and transport a food product as the head is moved can be provided. A plurality of mounting blocks can be slidably coupled to the rails where at least one suction device is coupled to each mounting block. An actuating device can be operatively associated with the mounting blocks such that each mounting block is configured to slide between a first position and a second position.

According to a second aspect of the invention, a food product system can be provided. The food product system can include a product supply device configured to receive food products and a conveyor system configured to receive the food products from the product supply device. A food product handling device can be configured to pick up and transport a plurality of food products from the product supply device to a food product receiving device. The food product handling device can include a movable loading head having a plurality of rails, a vacuum system operatively associated with the head, a plurality of suction devices carried by the head and configured to pick up and transport the plurality of food products as the head is moved where each suction device is coupled to the vacuum system, a plurality of mounting blocks slidably coupled to the rails, where at least one suction device is coupled to each mounting block, and an actuating device operatively associated with the mounting blocks such that each mounting block is configured to slide between a first position associated with the conveyor system and a second position associated with the food product receiving device.

According to a third aspect of the invention, a method of handling food products is provided. The method can include the steps of providing a plurality of food products and aligning a food product handling device above the plurality of food products. The food product handling device can include a movable loading head having a plurality of rails, a vacuum system operatively associated with the head, a plurality of suction devices carried by the head and configured to pick up and transport food products as the head is moved where each suction device is coupled to the vacuum system, a plurality of mounting blocks slidably coupled to the rails where one suction device is coupled to one mounting block and an actuating device operatively associated with the mounting blocks such that each mounting block is configured to slide between a first position and a second position. The method can further include the steps of applying a vacuum to each suction device of the food product handling device and thereby engaging food products with each suction device when the mounting blocks are in a first position. The mounting blocks can be actuated to the second position using the actuating device and the food products can be deposited into packaging material by ceasing application of the vacuum at each suction device.

Other aspects of the invention, including apparatus, devices, systems, converters, processes, and the like which constitute part of the invention, will become more apparent upon reading the following detailed description of the exemplary embodiments.

BRIEF DESCRIPTION OF THE DRAWINGS

The food product robot tool and methods associated therewith are described with reference to the following figures. These same numbers are used throughout the figures to reference like figures and components.

FIG. 8 is a perspective view of aligning the food product loading system with food products provided on a conveyor system according to the exemplary embodiment of the present invention.

FIG. 9 is a perspective view of removing the plurality of food products from the conveyor system using the food product loading system according to the exemplary embodiment of the present invention.

FIG. 10 is a perspective view of the plurality of food products grouped after actuating the mounting blocks of the food product loading system according to the exemplary embodiment of the present invention.

FIG. 11 is a perspective view of depositing the plurality of food products into the food product receiving device according to the exemplary embodiment of the present invention.

FIG. 13 is a top view of the food product handling device according to the alternative exemplary embodiment of the present invention in a first position.

FIG. 14 is a top view of the food product handling device according to the alternative exemplary embodiment of the present invention in a second position.

DETAILED DESCRIPTION

Figure 1:
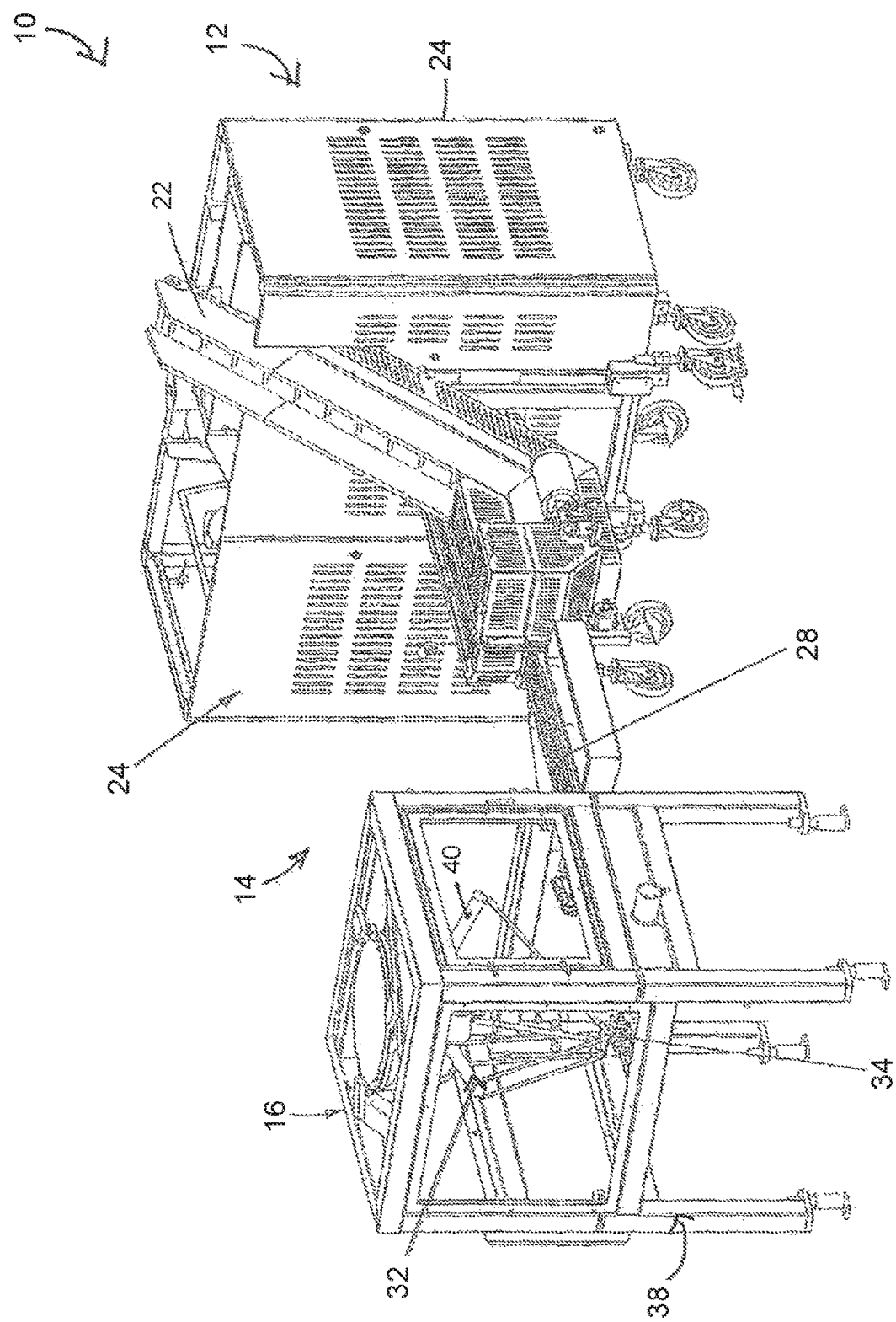
FIG. 1 is a perspective view of a food product handling system according to an exemplary embodiment of the present invention.

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the word "a" and "an" as used in the claims means "at least one" and the word "two" as used in the claims means "at least two".

In the present description, certain terms have been used for brevity, clearness and understanding. No unnecessary limitations are to be inferred therefrom beyond the requirement of the prior art because such terms are used for descriptive purposes only and are intended to be broadly construed. The different apparatus and methods described herein may be used alone or in combination with other systems and methods.

Figure 2:
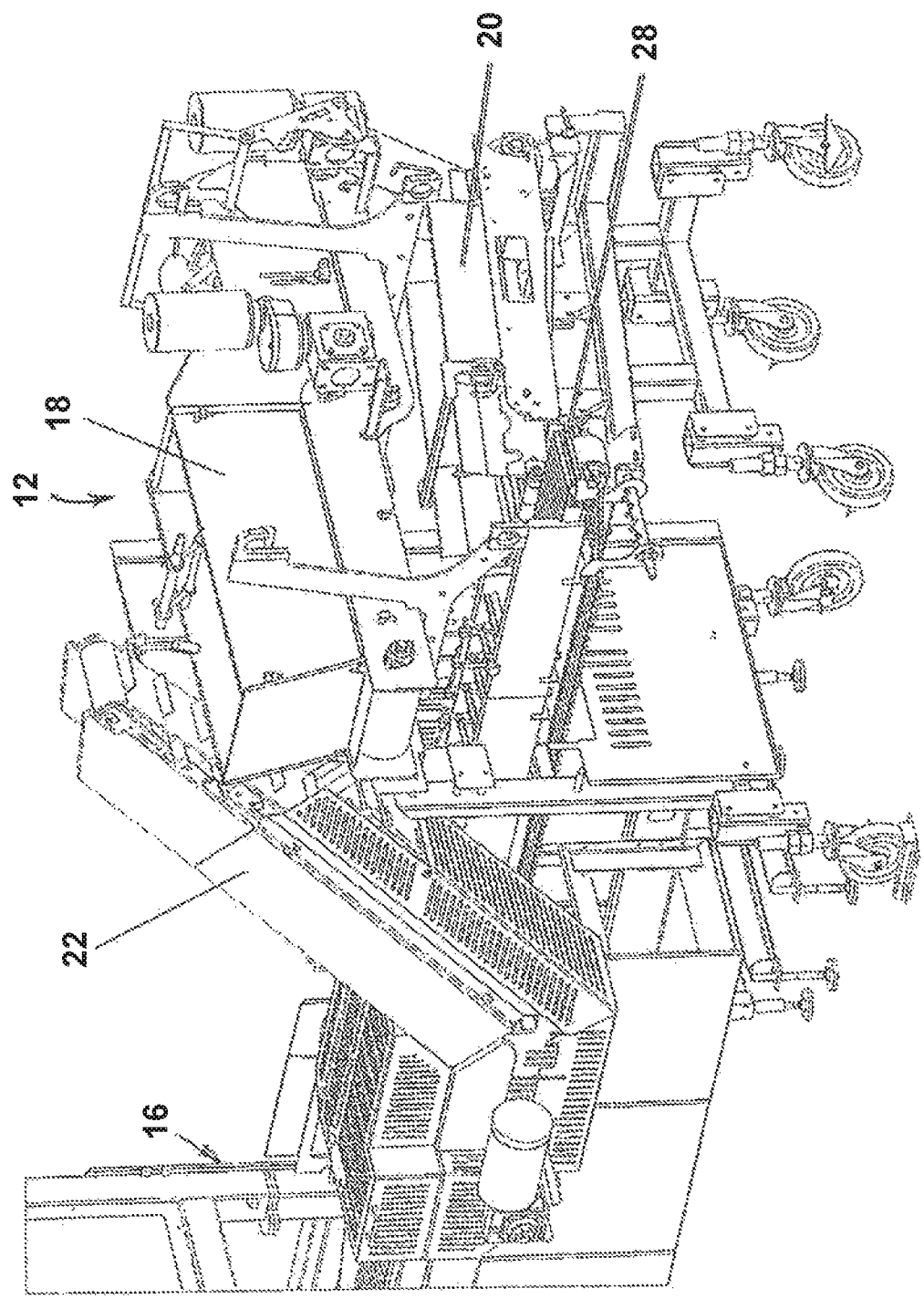
FIG. 2 is an alternative perspective view of the food product handling system of FIG. 1 according to the exemplary embodiment of the present invention.

As best illustrated in FIGS. 1 and 2, a food handling system 10 includes a product supply device 12, a conveyor system 14, and a food product loading system 16. Various types of food products can be introduced into the food handling system 10, such as hot dogs, sausages, cheese, and like generally cylindrical products, etc.

The product supply device 12 includes a hopper 18, an unscrambler 20, an excess conveyor 22, and guards 24. The hopper 18 is configured to hold food products 26. In an exemplary embodiment, the hopper 18 is positioned above the unscrambler 20 and below the output of excess conveyor 22. The hopper 18 can provide food products 26, as best shown in FIG. 8, to the unscrambler 20 at varying rates where the rates can be based on the type of food product currently being packaged. The unscrambler 20 is arranged to receive food products 26 from the hopper 18 and is configured to organize the food products 26 in such a manner that the food products 26 can be individually arranged onto a portion of the conveyor system 14. For example, the unscrambler 20 can unscramble the food products 26 and deliver the organized food products 26 to a conveyor belt 28. The excess conveyor 22 transports excess food product from the conveyor belt 28 to the hopper 18 when the food products 26 do not adequately fit on the conveyor belt 28. Guards 24 are provided to protect the hopper 18 and unscrambler 20 within the product supply device 12. It is noted that FIG. 2 illustrates the product supply device 12 without guards 24 for clarity and ease of illustration.

The conveyor system 14 includes conveyor belt 28 and is configured to transport the food products 26 from the product supply device 12 to the food product loading system 16. In an exemplary embodiment, the conveyor belt 28 can include partitions 30 such that a single food product 26 can be positioned on the conveyor belt 28 between adjacent partitions 30, as best shown in FIG. 10.

The food product loading system 16 includes a robotic loader 32 and a food product handling device 34. The food product loading system 16 is arranged such that the food product handling device 34 can sort, organize, and transport a plurality of food products 26 from the conveyor system 14 to the food product receiving device 36. In an exemplary embodiment, the robotic loader 32 can be suspended within a housing 38. The robotic loader 32 preferably has four axes of motion.

Figure 3:
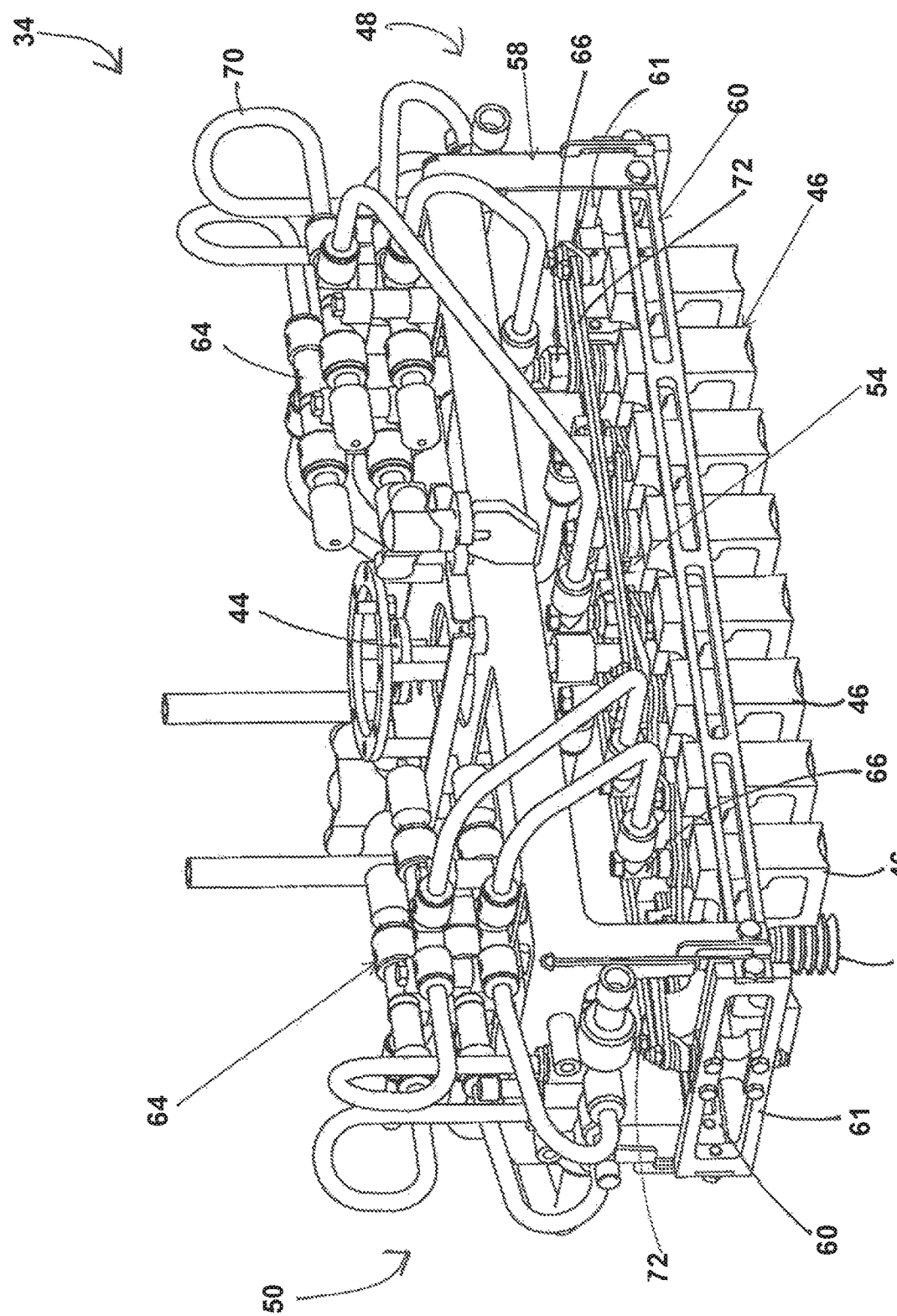
FIG. 3 is a fragmentary perspective view of a food product handling device according to the exemplary embodiment of the present invention in a first position.

The robotic loader 32 includes a plurality of arms 40 configured to position the food product handling device 34 with respect to the conveyor system 14. For example, the plurality of arms 40 of the robotic loader can translate the food product handling device 34 such that the food product handling device 34 has a degree of freedom with respect to three axes (e.g., x-axis, y-axis, and/or z-axis). In addition, the robotic loader 32 includes an arm 42 coupled to an actuation pivot 44, as best shown in FIG. 3, of the food product handling device 34 to provide an actuation force that translates the mounting blocks 46 between a first position and a second position. For example, the arm 42 of the robotic loader 32 coupled to the actuation pivot 44 can provide a torque to the actuation pivot 44 in a clockwise and/or counter-clockwise direction.

Figure 4:
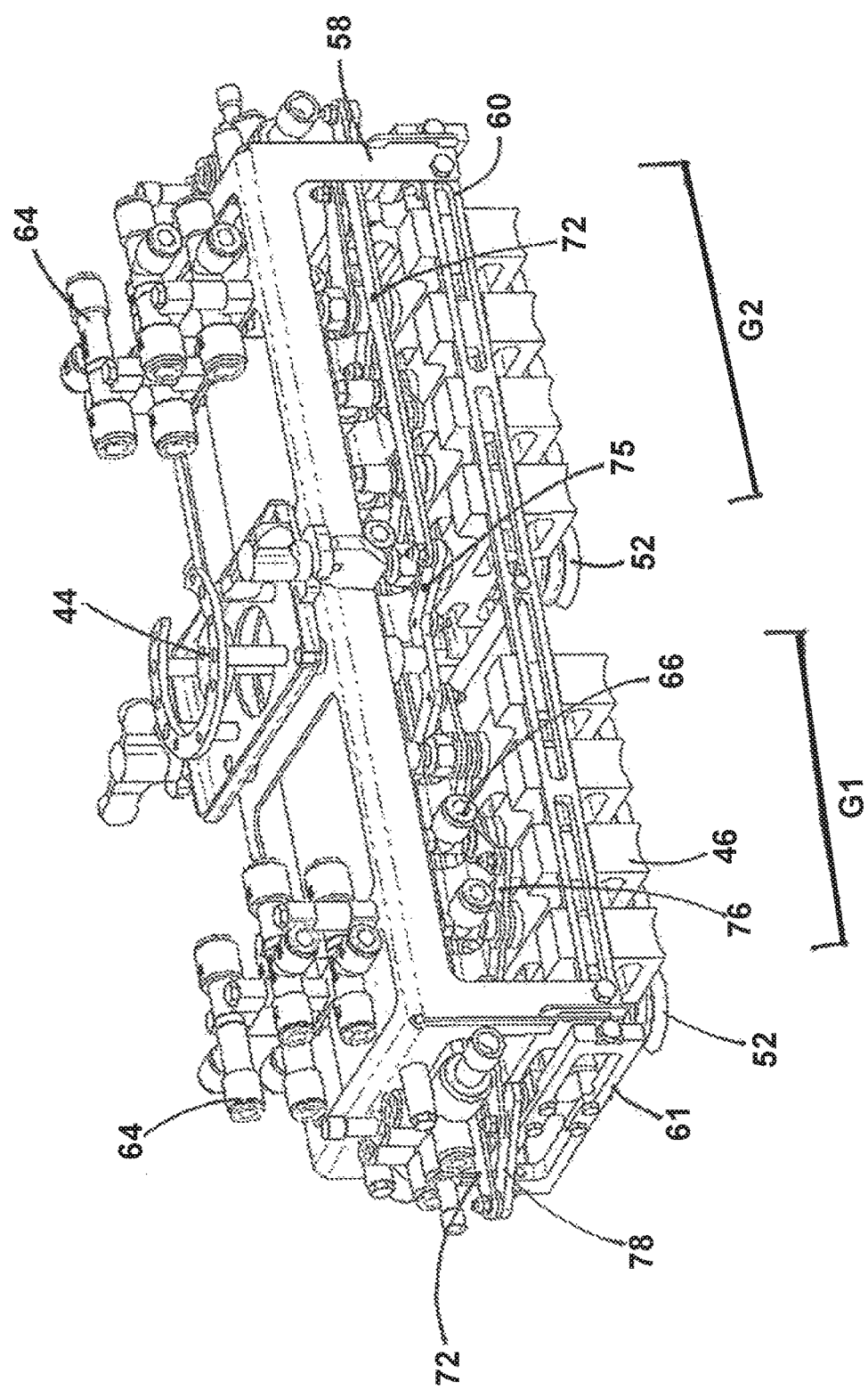
FIG. 4 is a fragmentary perspective view of the food product handling device according to the exemplary embodiment of the present invention in a second position.

As best illustrated in FIGS. 3 and 4, the food product handling device 34 includes a movable loading head 48, a vacuum system 50, a plurality of suction devices 52, a plurality of mounting blocks 46, and an actuating device 54. The food product handling device 34 is configured to remove the food products 26 from the conveyor system 14 and arrange the food products 26 into groups G1, G2 prior to placing the food products 26 in packaging material 56 associated with a food product receiving device 36, as best shown in FIGS. 8-11.

Figure 5:
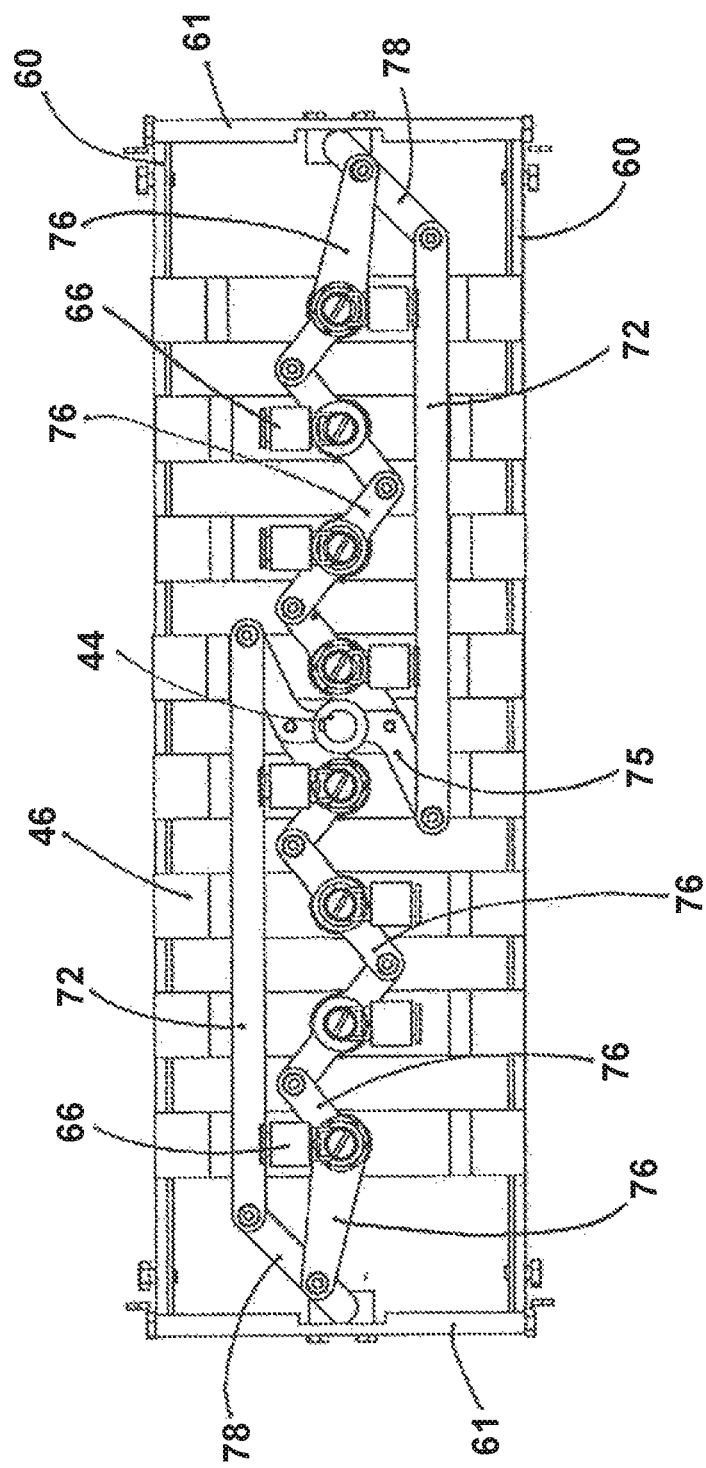
FIG. 5 is a top view of the food product handling device in the first position according to the exemplary embodiment of the present invention.
Figure 6:
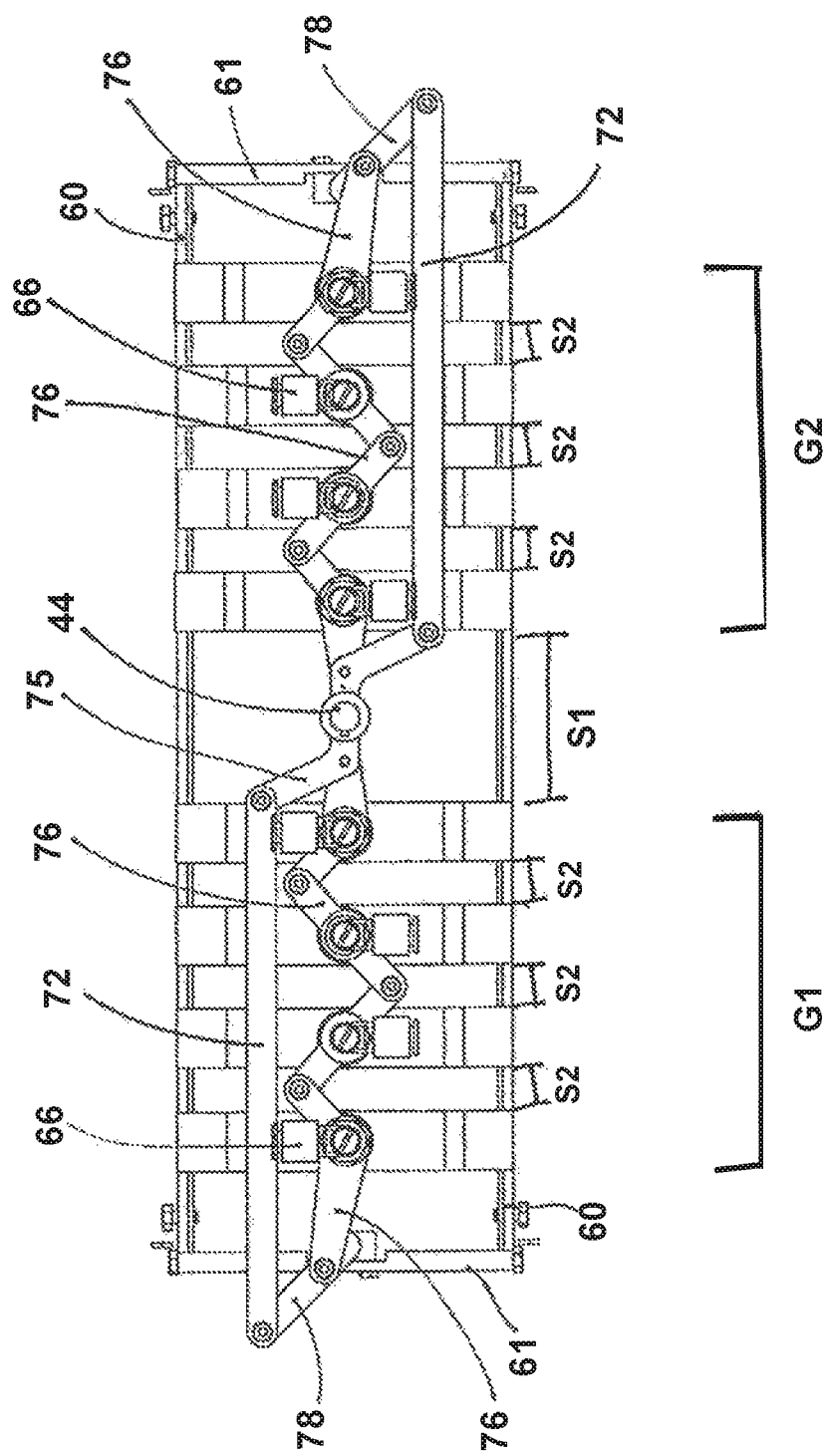
FIG. 6 is a top view of the food product handling device in the second position according to the exemplary embodiment of the present invention.
Figure 7:
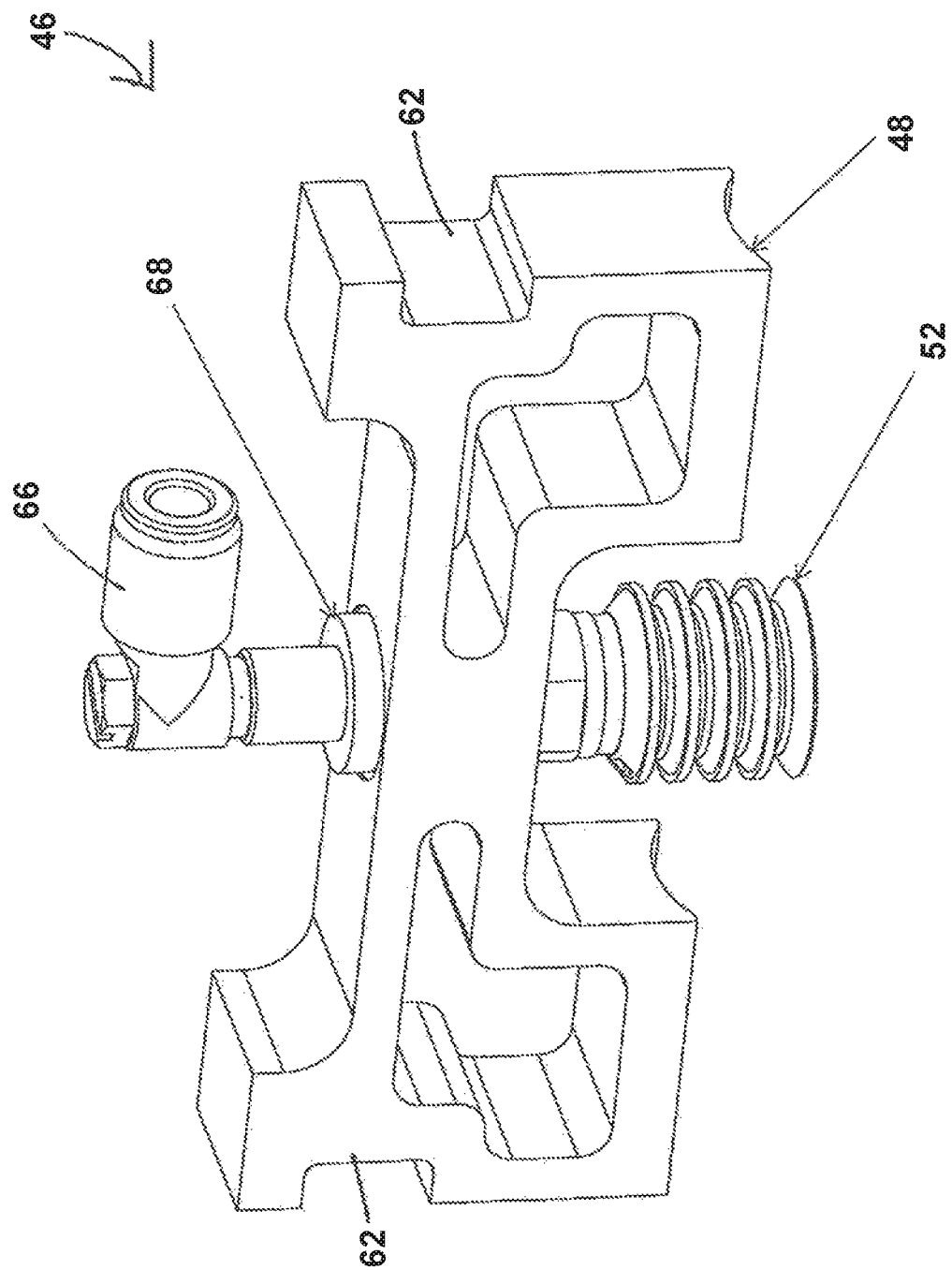
FIG. 7 is a perspective view of a mounting block of a food product handling device according to the exemplary embodiment of the present invention.

The movable loading head 48 includes a housing 58, a plurality of coupling rails 60 arranged in parallel within the housing 58, and a plurality of end connector rails 61, as best shown in FIGS. 3, 5, and 6. The mounting blocks 46 are slidably coupled to the rails 60 of the movable loading head 48. In an exemplary embodiment, as best illustrated in FIG. 7, each mounting block 46 includes a pair of grooves 62 configured to slidingly receive the plurality of rails 60. However, one of ordinary skill in the art would recognize that the plurality of mounting blocks 46 can be slidably coupled to the movable loading head 48 using any coupling technique.

At least one suction device 52 such as a suction cup can be carried by the movable loading head 48 and configured to pick up and transport one of the plurality of food products 26 from the conveyor system 14 to the food product receiving device 36. While only one suction device 52 is illustrated as being coupled to each mounting block 46, any number of suction devices 52 can be mounted on a single mounting block 46 where all suction devices 52 associated with the single mounting block 46 are in communication with one vacuum generator 64. The suction device 52 includes an elastic body, such as a bellows structure that can collapse to adapt to the size and/or shape of the corresponding food product 26. The suction device 52 may be made of a resilient material such as a silicone polymer or the like. In addition, the suction device 52 can be made out of silicone such as food grade silicone.

The vacuum system 50 includes a plurality of vacuum generators 64 operatively associated with the movable loading head 48. For example, the plurality of vacuum generators 64 can be disposed on the housing 58 of the movable loading head 48. The number of vacuum generators 64 is directly related to the number of mounting blocks where one vacuum generator 64 is coupled to each vacuum generator port 66. Each suction device 52 is coupled to a vacuum generator port 66 via a post 68 and a connector 70, such as a venturi tube. In an exemplary embodiment, the vacuum generators 64 can be operated in the range of approximately 30 to 87 kPa where the vacuum generators 64 create a vacuum in the range of approximately 10 to 60 psi at each corresponding suction device 52. The amount of vacuum generated at the suction device 52 is based on the type, size, and shape of the food product.

As best illustrated in FIG. 6, the actuating device 54 can include an actuating pivot 44 and at least one actuating arm 72 coupled to the actuating pivot 44. The actuating pivot 44 is disposed on the movable loading head 48 and is configured to receive a force from the actuation arm 42 of the robot loader 32. When a clockwise and/or counter-clockwise torque is applied to the actuating pivot 44, the at least one actuating arm 72 provides an actuation of at least two mounting blocks 46 between a first position and a second position. For example, as best illustrated in FIGS. 3 and 5, the plurality of mounting blocks 46 can be substantially equally spaced within the housing 58 of the movable loading head 48 when in the first position and, as best illustrated in FIGS. 4 and 6, the plurality of mounting blocks 48 can be articulated to form groups G1, G2 where a spacing 51 between the first group and a second group is greater than a spacing S2 between mounting blocks within each group G1, G2. When the plurality of mounting blocks 46 are arranged in groups G1, G2, the groups G1, G2 are associated with pockets 74 formed in the packaging material 56 of the food product receiving device 36 such that each group G1, G2 is aligned with one pocket 74, as best shown in FIGS. 8-11. While the mounting blocks 46 of food product handling device 34 are illustrated as being articulated into two groups G1, G2, one of ordinary skill in the art would recognize that any number of groups can be formed based on the number of articulating arms 72 and mounting blocks 46 provided that each group includes at least two mounting blocks 46.

In an exemplary embodiment, the actuating device 54 can further include actuation pivot connector 75, intermediary actuation connectors 76, and mounted actuation connectors 78. The actuation pivot connector 75 is directly coupled to the actuation pivot 44. The proximal ends of the actuation arms 72 are coupled to the actuation pivot connector 75. The intermediary actuation connectors 76 are coupled to the mounting blocks 46 and the mounted actuation connectors 78 are coupled between the actuation arm 72 and the end connector rail 61. In addition, the intermediary actuation connector 76 associated with the mounting block closest to the end connector rail 61 is further coupled to the mounted actuation connector 78. Each mounted actuation connector 78 can be mounted onto the corresponding end connector rail 61 such that the mounted actuation connector 78 is located substantially equal between the connector rails 60. As best shown in FIGS. 3, 5, and 6, the intermediary actuation connectors 76 are coupled to the mounting blocks 46 via the post 68 associated with each vacuum generator port 66 and adjacent intermediary actuation connectors 76 are coupled together. When an actuation force is applied to the actuation pivot, each actuation arm 72 translates with respect to the actuation pivot 44 and the mounted actuation connector 61 such that both actuation arms 72 remain substantially parallel with respect to each other during actuation between the first position and the second position.

In operation, food products 26 are loaded into the hopper 18 of the food product supply device 12. The hopper 18 provides the food products 26 to the collator or unscramble 20 at a predetermined rate. The collator 20 unscrambles the food products 26 provided by the hopper 18 and organizes the food products 26 such that the food products 26 are individually arranged on the conveyor system 14. The food products 26 are substantially equally spaced on the conveyor belt 28 of the conveyor system 14. As the food products 26 travel from the product supply device 12 to the food product loading system 16, the robotic loader 32 aligns the food product handling device 34 above the food products 26. The robotic loader 32 than lowers the food product handling device 34 such that the suction devices 52 contact the food products 26. A vacuum is applied to each suction device 52 of the food product handling device 34 using vacuum generators 64, thereby engaging a single food product 26 with each suction device 52 by application of a suction force. As best illustrated in FIGS. 3 and 5, the mounting blocks 46 of the food product handling device 34 are arranged such that they are substantially equally spaced in a first position when the food products 26 are first engaged with the suction devices 52.

The mounting blocks 46 are then actuated to a second position using the actuating device 54 of the food product handling device 34. In an exemplary embodiment, an actuation force is applied by arm 42 of the robot loader 32 to the actuation pivot 44 of the actuating device 54. As best illustrated in FIGS. 5 and 6, the actuation pivot 44 is coupled with actuation arms 72 where a first end of each actuation arm 72 is coupled to the actuation pivot 44 and a second end of each actuation arm 72 is coupled to an intermediary actuation connector 76. In addition, at least one intermediary actuation connector 76 is coupled with a mounting block 48 of the food product handling device 34 such that the mounting blocks 48 are slidably actuated into groups G1, G2 based on the actuation force applied to the actuation pivot 44 and translated through the actuation arms 72 and the intermediary actuation connectors 76.

The robotic loader 32 then translates the food product handling device 34 from a first position associated with the conveyor system 14 to a second position associated with the food product receiving device 36. It is noted that the mounting blocks 48 can be slidably actuated before, after, or while the robotic loader 32 translates the food product handling device 34 from the conveyor system 14 to the food product receiving device 36. When the robotic loader 32 reaches the second position, the groups G1, G2 of the food products 26 are aligned with the pockets 74 formed in the packaging material 56 of the food product receiving device 36. The robotic loader 32 can align the groups G1, G2 in a vertical or horizontal direction such that the groups G1, G2 of food product 26 are deposited into adjacent pockets 74 when the vacuum generators 64 cease applying a suction pressure to the suction devices 52. Those skilled in the art would recognize that the pockets 74 are typically formed from a transparent, flexible polymer material known in the food industry.

After the food products 26 are deposited into the pockets 74 of the packaging material 56, the robotic loader 32 can provide an actuation force to the actuation pivot 44 such that the mounting blocks 46 return to the first position having a substantially equal space between adjacent mounting blocks 46. In addition, the robotic loader 32 can return the food product handling device 34 to a location associated with the conveyor system 14 and the above described steps can be repeated. When the robotic loader 32 subsequently returns to the position associated with the food product receiving device 36, the robotic loader 32 can align the groups G1, G2 of food product 26 with the same or different pocket 74 in which the preceding groups of food products 26 were deposited.

Figure 12:
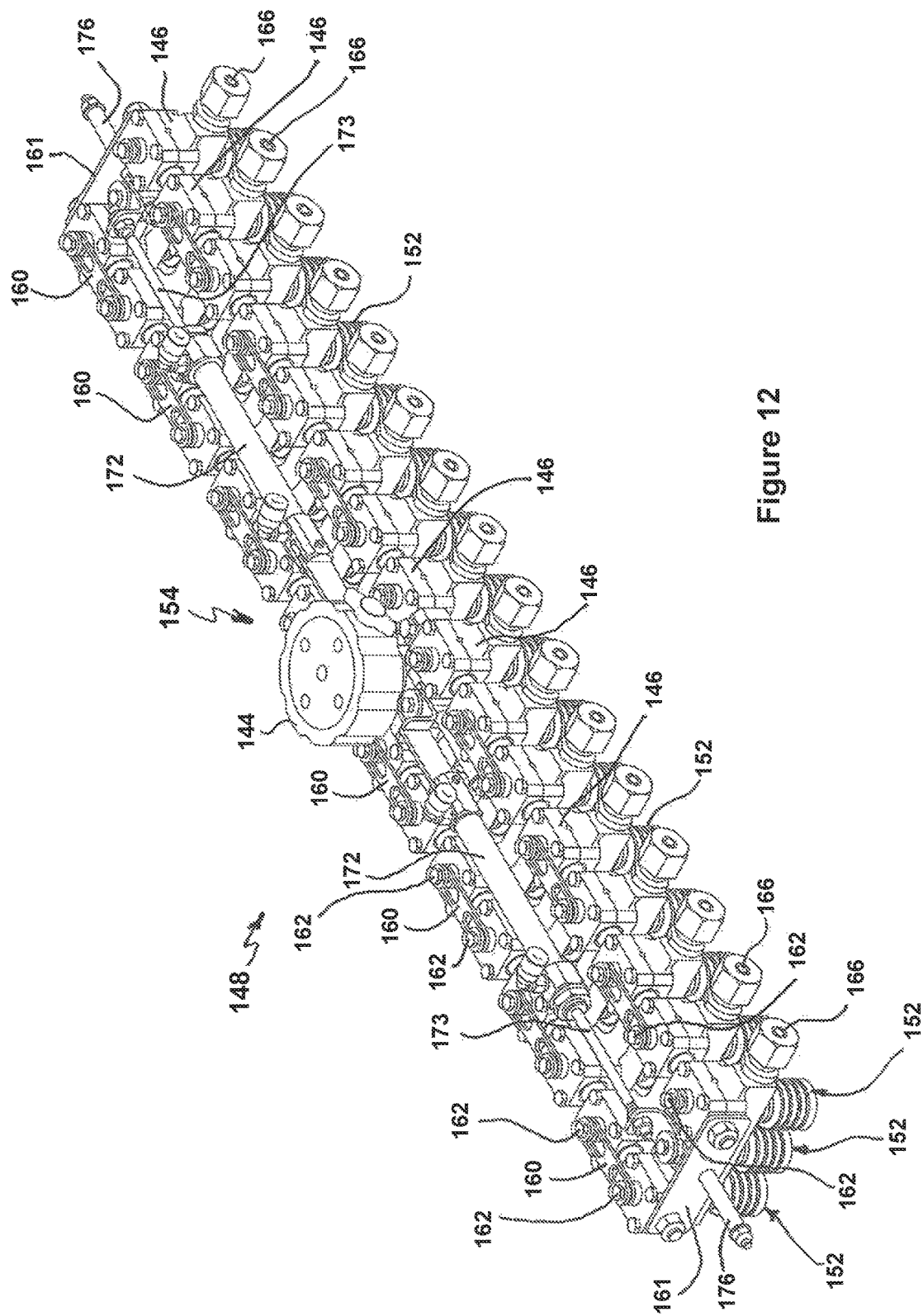
FIG. 12 is a fragmentary perspective view of the food product handling device according to an alternative exemplary embodiment of the present invention.

In a food product handling device according to an alternative exemplary embodiment of the present invention, illustrated in FIGS. 12-14, the movable loading head 48 is replaced by a movable loading head 148. The food product handling device according to the alternative exemplary embodiment of the present invention corresponds substantially to the food product handling device 34 of FIGS. 1-11, and only the movable loading head 148, which differs, will therefore be explained in detail below. The food product handling device according to the alternative exemplary embodiment includes the movable loading head 148, the vacuum system 50, a plurality of suction devices 152, a plurality of mounting blocks 146, and an actuating device 154. The food product handling device according to the alternative exemplary embodiment is configured to remove the food products 26 from the conveyor system 14 and arrange the food products 26 into groups G1, G2 prior to placing the food products 26 in packaging material 56 associated with a food product receiving device 36, as best shown in FIGS. 8-11.

The movable loading head 148 includes a plurality of coupling rails 160 arranged in parallel, and end connector rails 161, as best shown in FIG. 12. The mounting blocks 146 are slidably coupled to the coupling rails 160 of the movable loading head 148. In the alternative exemplary embodiment, as best illustrated in FIG. 12, each mounting block 146 includes one, preferably two outwardly extending coupling pins 162 each configured to be slidingly received through one of the coupling rails 160 so as to drivingly couple two adjacent mounting blocks 146 to one another by one of the coupling rails 160. As best shown in FIG. 12, every two adjacent mounting blocks 146 are also slidably coupled so each other so as to be axially slideable relative to each other. However, one of ordinary skill in the art would recognize that the plurality of the mounting blocks 146 can be slidably and drivingly coupled to each other using any appropriate coupling technique. As further illustrated in FIGS. 12-14, the mounting blocks 146 are slidably mounted on a center rod 175 (best shown in FIGS. 13 and 14) and two opposite outer rods 176.

While three suction devices 152 are illustrated as being coupled to each of the mounting blocks 146, any number of the suction devices 152 (i.e., less or more than three) can be mounted on a single mounting block 146 where all suction devices 152 associated with the single mounting block 146 are in communication with one vacuum generator, such as the vacuum generator 64 shown in FIGS. 3 and 4. Each of the suction devices 152 includes an elastic body, such as a bellows structure that can collapse to adapt to the size and/or shape of the corresponding food product 26. Each of the suction devices 152 may be made of a resilient material such as a silicone polymer or the like. In addition, the suction devices 152 can be made out of silicone such as food grade silicone.

According to the alternative exemplary embodiment, the vacuum system 50 includes the vacuum generators 64 operatively associated with the movable loading head 148. The number of the vacuum generators 64 is directly related to the number of mounting blocks 146, where one of the vacuum generators 64 is coupled to each of vacuum generator ports 166 of the suction devices 152. In the alternative exemplary embodiment, the vacuum generators 64 can be operated in the range of approximately 30 to 87 kPa where the vacuum generators 64 create a vacuum in the range of approximately 10 to 60 psi at each corresponding suction device 152. The amount of vacuum generated at the suction device 152 is based on the type, size, and shape of the food product 26.

As best illustrated in FIG. 12, the actuating device 154 includes a fluid manifold 144, and two axially opposite actuating cylinders 172 fluidly connected to and activated by the fluid manifold 144. In other words, the fluid manifold 144 is operatively associated with each of the actuating cylinders 172. The fluid manifold 144 is disposed on the movable loading head 148 and is connected to the vacuum system 50. Each of the fluid cylinders 172 has a piston rod 173 extending from and reciprocating relative to the actuating cylinder 172. Specifically, in an unactuated position (FIG. 13), the piston rod 173 extends from the actuating cylinder 172, while in an actuated position (FIG. 14), the piston rod 173 is retracted into the actuating cylinder 172.

As best illustrated in FIG. 12, a free proximal end of the actuating cylinder 172 is directly coupled to a proximal mounting block 146 of one of the groups G1, G2 closest to the fluid manifold 144, while a free distal end of the piston rod 173 is directly coupled to a distal mounting block 146 of one of the groups G1, G2 closest to one of the end connector rails 161. Moreover, the distal mounting block 146 of each of the groups G1, G2 is fixed (i.e., non-moveably connected) to one of the end connector rails 161, as best shown in FIG. 12.

Accordingly, in the unactuated position (when the actuating cylinders 172 are de-actuated), the piston rods 173 extend outwardly from the actuating cylinders 172 in opposite directions so as to displace the proximal mounting block 146 of each of the groups G1, G2 to a first position from a second position. In other words, to displace the proximal mounting block 146 of each of the groups G1, G2 away from the distal mounting block 146. As the proximal mounting block 146 moves away from the distal mounting block 146, the mounting block 146 adjacent to the proximal mounting block 146 also moves away from the distal mounting block 146 by the coupling pins 162 and the coupling rail 160. Similarly, all the mounting blocks 146 between the distal mounting block 146 and the proximal mounting block 146 are displaced in the direction away from the distal mounting block 146 by the coupling pins 162 and the coupling rails 160.

In the actuated position (when the actuating cylinders 172 ares actuated and the vacuum is applied to the actuating cylinders 172 from the vacuum system 50), the piston rods 173 retracts inwardly into the actuating cylinders 172 in opposite directions so as to displace the proximal mounting block 146 of each of the groups G1, G2 from the first position to the second position. In other words, to displace the proximal mounting block 146 of each of the groups G1, G2 toward the distal mounting block 146. As the proximal mounting block 146 moves toward the distal mounting block 146, the mounting block 146 adjacent to the proximal mounting block 146 also moves toward the distal mounting block 146 by the coupling pins 162 and the coupling rail 160. Similarly, all the mounting blocks 146 between the distal mounting block 146 and the proximal mounting block 146 are displaced in the direction toward the distal mounting block 146 by the coupling pins 162 and the coupling rails 160.

As best illustrated in FIGS. 13 and 14, the plurality of the mounting blocks 146 can be substantially equally spaced on the movable loading head 148 when in the first position and, as best illustrated in FIG. 13. The plurality of the mounting blocks 146 can be articulated to form the groups G1, G2 where a spacing 51 between the first group G1 and the second group G2 is greater than a spacing S2 between mounting blocks within each of the groups G1 and G2 when in the second position. When the mounting blocks 146 are arranged in the groups G1, G2, the groups G1, G2 are associated with pockets 74 formed in the packaging material 56 of the food product receiving device 36 such that each of the groups G1, G2 is aligned with one pocket 74, as best shown in FIGS. 8-11. While the mounting blocks 146 of food product handling device 34 are illustrated as being articulated into two groups G1, G2, one of ordinary skill in the art would recognize that any number of groups can be formed based on the number of the actuating cylinders 172 and mounting blocks 146, provided that each group G1 or G2 includes at least two mounting blocks 146. In other words, the fluid manifold 144 and the at least one actuating cylinder 172 provides an actuation of at least two mounting blocks 146 between the first position and the second position.

In operation, food products 26 are loaded into the hopper 18 of the food product supply device 12. The hopper 18 provides the food products 26 to the collator 20 at a predetermined rate. The collator 20 unscrambles the food products 26 provided by the hopper 18 and organizes the food products 26 such that the food products 26 are individually arranged on the conveyor system 14. The food products 26 are substantially equally spaced on the conveyor belt 28 of the conveyor system 14. As the food products 26 travel from the product supply device 12 to the food product loading system 16, the robotic loader 32 aligns the food product handling device 34 above the food products 26. The robotic loader 32 than lowers the movable loading head 148 such that the suction devices 152 contact the food products 26. A vacuum is applied to each of the suction devices 152 of the movable loading head 148 using the vacuum generators 64 thereby engaging a single food product 26 with each of the suction devices 152 using a suction force. As best illustrated in FIG. 13, the mounting blocks 146 of the movable loading head 148 are arranged such that they are substantially equally spaced in the first position when the food products 26 are first engaged with the suction devices 152.

The mounting blocks 146 are then actuated to the second position using the actuating device 154 of the food product handling device. In the alternative exemplary embodiment, an actuation force is applied by the actuating cylinders 172 of the actuating device 154. The fluid manifold 144 is fluidly coupled with the actuating cylinders 172 and is configured to receive vacuum from the vacuum system 50. In addition, the mounting blocks 146 are slidably actuated into the groups G1, G2 based on the actuation force applied by the actuating cylinders 172 and translated through the piston rod 173 to the mounting blocks 146.

The robotic loader 32 then translates the movable loading head 148 from a first position associated with the conveyor system 14 to a second position associated with the food product receiving device 36. It is noted that the mounting blocks 146 can be slidably actuated before, after, or while the robotic loader 32 translates the movable loading head 148 from the conveyor system 14 to the food product receiving device 36. When the robotic loader 32 reaches the second position, the groups G1, G2 of the food products 26 are aligned with the pockets 74 formed in the packaging material 56 of the food product receiving device 36. The robotic loader 32 can align the groups G1, G2 in a vertical or horizontal direction such that the groups G1, G2 of food product 26 are deposited into adjacent pockets 74 when the vacuum generators 64 cease applying a suction pressure to the suction devices 152. Those skilled in the art would recognize that the pockets 74 are typically formed from a transparent, flexible polymer material known in the food industry.

After the food products 26 are deposited into the pockets 74 of the packaging material 56, the mounting blocks 146 return to the first position having a substantially equal space between adjacent mounting blocks 146. In addition, the robotic loader 32 can return the movable loading head 148 to a location associated with the conveyor system 14 and the above described steps can be repeated. When the robotic loader 32 subsequently returns to the position associated with the food product receiving device 36, the robotic loader 32 can align the groups G1, G2 of the food product 26 with the same or different pocket 74 in which the preceding groups of food products 26 were deposited.

It should be understood that various changes and modifications to the presently disclosed embodiment as described herein will be apparent to those skilled in the art. Such changes and modifications may be made without departing from the spirit and scope of the present application and without diminishing its intended advantages.

The invention claimed is:

1. A food product handling device, comprising:
a movable loading head having a plurality of coupling rails;
a vacuum system operatively associated with the loading head;
a plurality of suction devices carried by the loading head and configured to pick up and transport a food product as the loading head is moved, each of the suction devices selectively coupled to the vacuum system;
a plurality of mounting blocks slidably mounted transversely to, and adjacently coupled to each other by, the coupling rails such that the space between each mounting block and any adjacent mounting block thereto is variable, at least one of the suction devices coupled to each of the mounting blocks; and
an actuating device operatively associated with the mounting blocks for sliding each of the mounting blocks between a first position and a second position;
the actuating device including an actuating cylinder configured to displace the mounting blocks between the first position and the second position; wherein,
the mounting blocks are arranged within the movable loading head in a first group and a separate second group when the mounting blocks are in the second position such that a distance between respective mounting blocks at opposed adjacent ends of the first group and the second group is greater than a distance between adjacent mounting blocks when in the first position, and spacing between adjacent mounting blocks within the respective first and second groups is smaller than the distance between adjacent mounting blocks when in the first position.

2. The device of claim 1, wherein the actuating device further includes a fluid manifold operatively associated with the actuating cylinder and the vacuum system.

3. The device of claim 1, wherein the vacuum system comprises a plurality of vacuum generators disposed on the movable loading head, and one or more vacuum generator ports coupled to each of the mounting blocks.

4. The device of claim 3, wherein each of the vacuum generators is operatively coupled with one suction device.

5. The device of claim 4, wherein a venturi tube is coupled between each of the vacuum generators and each of the vacuum generator ports.

6. The device of claim 1, wherein each of the suction devices comprises an elastic body.

7. The device of claim 6, wherein each elastic body comprises a bellows structure.

8. The device of claim 1, wherein each of the mounting blocks further comprises at least one coupling pin configured to be slidingly received through one of the coupling rails so as to drivingly couple two adjacent mounting blocks to one another by one of the coupling rails.

9. The device of claim 1, wherein the coupling rails are arranged in parallel within the movable loading head.

10. The device of claim 1, further comprising two groups of the mounting blocks wherein the actuating device includes a pair of opposite actuating cylinders each configured to displace the mounting blocks of one of the two groups between the first position and the second position.

11. The device of claim 10, wherein the mounting blocks of the two groups are substantially equally spaced from one another when in the first position.

12. A food product system, comprising:
a product supply device configured to receive a food product;
a conveyor system configured to receive the food product from the product supply device; and
a food product handling device configured to pick up and transport a plurality of food products from the product supply device to a food product receiving device, the food product handling device comprising:
a movable loading head (148) having a plurality of coupling rails (160);
a vacuum system (50) operatively associated with the loading head (148);
a plurality of suction devices (152) carried by the loading head (148) and configured to pick up and transport a food product (26) as the loading head (148) is moved, each of the suction devices (152) selectively coupled to the vacuum system (50);
a plurality of mounting blocks (146) slidably mounted transversely to, and adjacently coupled to each other by, the coupling rails (160) such that the space between each mounting block and any adjacent mounting block thereto is variable, at least one of the suction devices (152) coupled to each of the mounting blocks (146); and
an actuating device (154) operatively associated with the mounting blocks for sliding each of the mounting blocks (146) between a first position and a second position;
the actuating device including an actuating cylinder (172) configured to displace the mounting blocks (146) between the first position and the second position; wherein,
the mounting blocks (146) are arranged within the movable loading head (148) in a first group and a separate second group when the mounting blocks (146) are in the second position such that a distance between respective mounting blocks (146) at opposed adjacent ends of the first group and the second group is greater than a distance between adjacent mounting blocks (146) when in the first position, and spacing between adjacent mounting blocks (146) within the respective first and second groups is smaller than the distance between adjacent mounting blocks (146) when in the first position.

13. The system of claim 12, wherein the food product receiving device comprises packaging material formed into pockets configured to receive the plurality of food products from the food product handling device.

14. The system of claim 13, wherein the product supply device comprises a hopper configured to receive the plurality of food products and a food product unscrambler configured to organize the plurality of food products prior to depositing them on the conveyor system.

15. The system of claim 12, wherein the actuating device further includes a fluid manifold operatively associated with the actuating cylinder and the vacuum system.

16. The system of claim 12, wherein the vacuum system comprises a plurality of vacuum generators disposed on the movable loading head, and one or more vacuum generator ports coupled to each of the mounting blocks.

17. The system of claim 16, wherein each of the vacuum generators is operatively coupled with one suction device.

* * * * *